April 15, 1930. L. F. DOUGLASS 1,755,105
CAMERA ATTACHMENT
Filed March 13, 1928
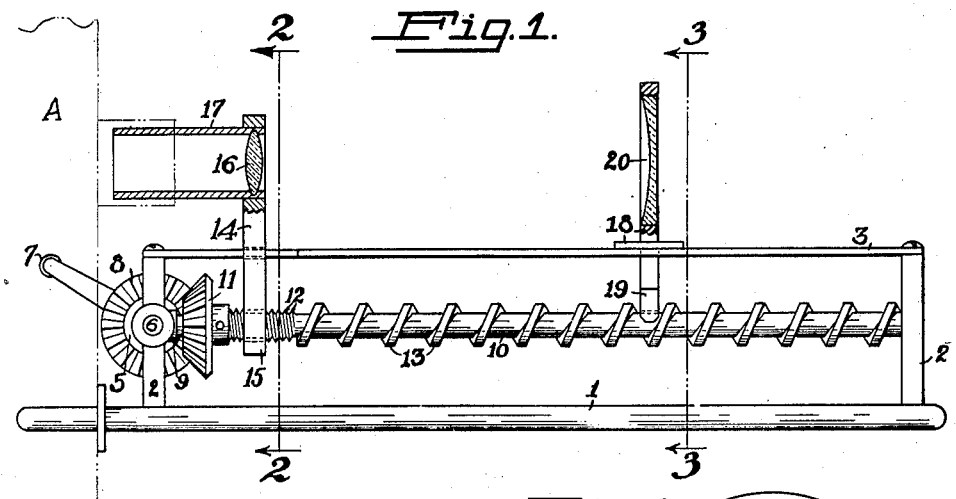
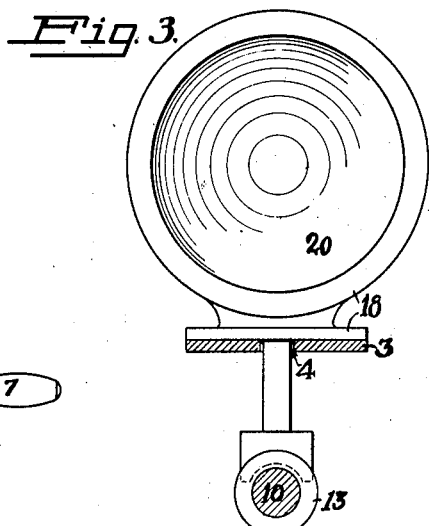
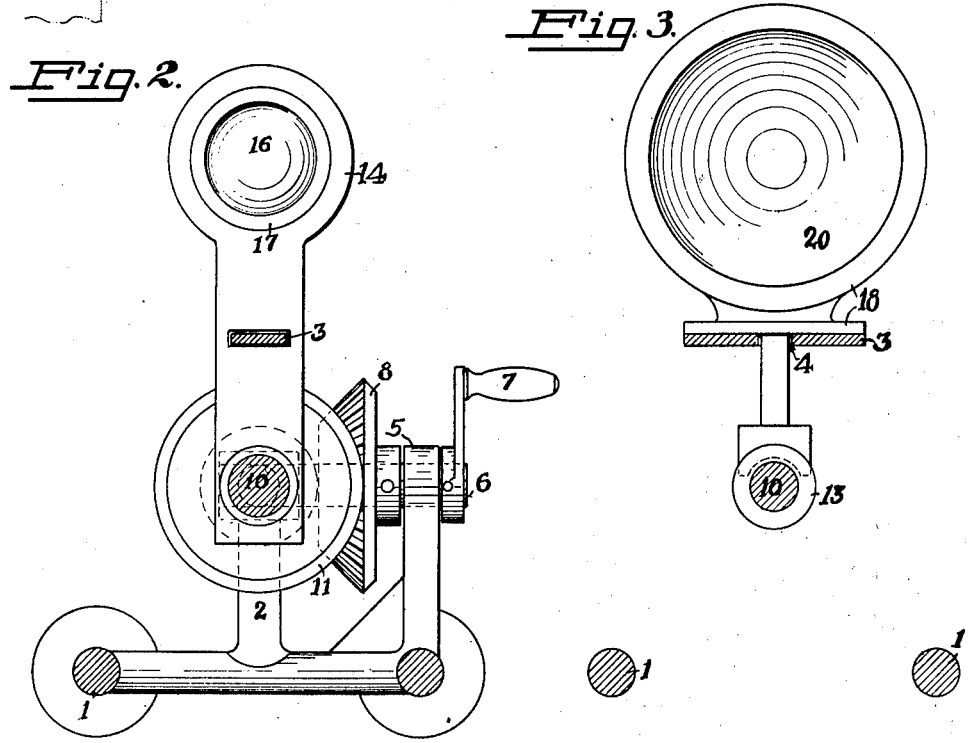
INVENTOR.
Leon F. Douglass
BY
J. E. Trabucco
ATTORNEY.

Patented Apr. 15, 1930

1,755,105

UNITED STATES PATENT OFFICE

LEON F. DOUGLASS, OF MENLO PARK, CALIFORNIA

CAMERA ATTACHMENT

Application filed March 13, 1928. Serial No. 261,249.

This invention relates to improvements in camera attachments of the type which enables the production of a series of images on a photographic film having the same effects as if the object photographed and the camera were moved toward or away from each other as the film was being exposed.

An object of my invention is to provide improved apparatus for use with cameras which, without the movement of the camera or object, enables the production of a series of images of an object having the same effect as if the camera and object were moved closer together or farther away from each other while the photographs were being taken.

A still further object is to provide apparatus of the above character which is so constituted that when an extreme "close-up" is taken, the background as well as the object being photographed, will be in proper focus.

Other objects more or less apparent will present themselves or will be specifically pointed out in the description to follow.

In the accompanying drawing,

Fig. 1 is a side view of an improved camera attachment embodying my invention, showing the lenses in cross section;

Fig. 2 is a sectional view of the same taken on the line 2—2 of Fig. 1; and

Fig. 3 is a sectional view of the same taken on the line 3—3 of Fig. 1.

Referring to the drawings, the numeral 1 represents a pair of supporting members having projecting ends adapted to fit in suitably positioned recesses located in the camera A. Supported above the members 1 by uprights 2 is a horizontally disposed plate 3 which is provided with a centrally located slot 4 extending longitudinally therein.

Movably extending through an upright side support 5 is shaft 6 having attached thereto an operating handle 7 and a bevel gear 8.

Positioned beneath the slot 4 in the plate 3, with one end movably located in a recessed projection 9 provided on the left hand upright 2, is a horizontally disposed rod 10. Secured on the rod 10 is a bevel gear 11 having its teeth in mesh with the bevel gear 8, thereby providing means for rotating the said rod through the movement of the handle 7.

The rod 10 is provided adjacent the bevel gear 11 with a plurality of small right handed threads 12, and also with a plurality of large widely separated left handed threads 13.

Supported above the plate 3 by a frame 14 which movably extends around the narrowed portion of the said plate and has its downwardly projecting end 15 provided with a threaded hole in which the threads 12 of the rod 10 are located, is a double convex camera lens 16 having a lens tube 17 positioned around the same. Lens 16 is preferably the standard convex lens of the camera.

Movably supported by a frame 18 which has a downwardly projecting end 19 extending through the central slot 4 in plate 3, is a plano-concave lens 20 of approximately —4 diopters. The extreme end of the downwardly projecting part 19 of the frame 18 is positioned between the large threads 13 of the rod 10, thereby enabling the plano-concave lens to be moved in backward and forward directions upon the rotation of the said rod by the manipulation of the handle 7.

Owing to the fact that the small threads 12 are right handed and the large threads 13 are left handed, the frame 14 and the frame 18 will be moved either farther away from each other or closer toward each other, dependent upon the direction the handle 7 is turned. The small threads 12 are numbered about sixty-four to the inch, while the large threads 13 are numbered about two to the inch, thereby permitting the lens 20 to be moved for a much greater distance upon a rotation of the rod 10 than will the lens 16.

In ordinary practice a film, which for the sake of brevity and clearness has been omitted from the drawing, is positioned within the camera directly behind the lens 16, and the same is exposed in the usual manner by the ordinary operating mechanism of the camera.

When it is desired to produce a film having a series of images of an object which have the same appearance as if the object was gradually enlarged, the handle 7 is turned to the right, thereby causing the rod 10 to rotate in a counter-clockwise direction, which through the frames 14 and 18 moves the lenses 16 and 20 closer together. The bringing of the two lenses toward each other causes each successive image produced on the film to be produced in a gradual increasing enlarged form, this being due to the separating of the light rays from the object photographed by the concave lens 20. The movement of the lenses away from each other causes the produced images to have the opposite effect, or a gradual reducing in size. Owing to the fact that the two lenses are maintained in proper operating positions at all times during their movement, the "close up" images of the nearby objects, as well as the images of the objects in the background, are kept in proper focus.

The ratio of movement of the lenses with respect to the degree of curvature of the concave lens is such that the object photographed as well as the background surrounding the object are always in focus.

It is of course apparent to those skilled in the art that the drawings are designed for illustration purposes only, and that the curvature of the lenses as well as the means for moving them together or farther apart may be changed at will, without departing from the spirit of my invention. I therefore desire that the appended claims be considered as defining the limits my invention may assume.

Having described my invention, what I claim is:

1. In a device of the class described, the combination with a camera having its lens adjustably mounted for focusing, of a concave lens positioned in front of the camera lens, and means cooperating with the camera lens and the concave lens for moving said lenses toward or away from each other in the ratio required to maintain a scene to be photographed always in focus.

2. In a device of the class described, the combination with a camera having its lens adjustably mounted for focusing, of a concave lens positioned in front of the camera lens with its axis coinciding with the axis of the camera lens, and common means for simultaneously moving the camera lens and the concave lens in a substantially straight path toward or away from each other at rates proportioned to maintain a scene to be photographed always in focus.

3. In a device of the class described, the combination with a camera having a film support and having its lens mounted for focusing adjustment, of a concave lens positioned in front of the camera lens with its axis coinciding with the axis of the camera lens, means for simultaneously moving the lenses toward or away from each other, and means for guiding the lenses whereby they travel only in a substantially straight path, whereby the light rays from a scene to be photographed are focused on the film at all times.

4. In a device of the class described, the combination with a camera having its lens movably positioned for focusing, of a second lens of concave curvature movably positioned in front of the first lens with their axes substantially parallel, means for simultaneously moving the two lenses toward or away from each other, one of said lenses being moved at a faster rate of speed than the other of the said lenses, and means for guiding the lenses as they are being moved so they both travel in a substantially straight line, said rates of speed being such that a scene to be photographed is always in focus.

5. In an apparatus of the class described, the combination with a camera having its lens mounted for focusing adjustment, of a concave lens positioned to direct the image of an object being photographed through said camera lens, and manually operatable means interconnecting the camera lens and concave lens for simultaneously moving each of said lenses at different rates of speed toward or away from each other whereby the object being photographed as well as the background surrounding said object is always maintained in focus.

6. In apparatus of the class described, the combination with a camera having a sensitized surface support and having its lens adjustably mounted for focusing, of a concave lens mounted to direct the image of an object being photographed through said camera lens and onto said sensitized surface, and common means for simultaneously moving each of said lenses toward or away from the other, the concave lens being movable at a greater speed than said camera lens whereby the light rays from the object may be focused on the sensitized surface at all times.

7. In a device of the class described, the combination with a camera having its lens adjustably mounted for focusing, of a concave lens positioned in front of the camera lens, a shaft having right and left hand threads thereon, and means operatively connecting each of said lenses with one of said threads, whereby rotation of said shaft causes relative movement between said lenses.

8. In a device of the class described, the combination with a camera having its lens mounted for focusing adjustment, of a concave lens positioned in front of the camera lens, and means for simultaneously moving the lenses along a substantially straight line but in opposite directions at different speeds such that a scene to be photographed is maintained always in focus.

LEON F. DOUGLASS.